United States Patent [19]

Rao

[11] Patent Number: 4,485,992

[45] Date of Patent: Dec. 4, 1984

[54] LEADING EDGE FLAP SYSTEM FOR AIRCRAFT CONTROL AUGMENTATION

[75] Inventor: Dhanvada M. Rao, Hampton, Va.

[73] Assignee: The United States of America as represented by the Administrator of the National Aeronautics and Space Administration, Washington, D.C.

[21] Appl. No.: 522,628

[22] Filed: Aug. 12, 1983

Related U.S. Application Data

[63] Continuation of Ser. No. 301,078, Sep. 10, 1981, abandoned.

[51] Int. Cl.³ .............................................. B64C 9/00
[52] U.S. Cl. ................................. 244/90 R; 244/214
[58] Field of Search .............. 244/213, 214, 199, 207, 244/90 R, 90 A

[56] References Cited

U.S. PATENT DOCUMENTS

| | | | |
|---|---|---|---|
| 2,070,705 | 2/1937 | Barnhart | 244/214 |
| 2,635,837 | 4/1953 | Grant | 244/90 R |
| 2,768,801 | 10/1956 | Bitner et al. | 244/90 R |
| 3,143,317 | 8/1964 | Walley et al. | 244/214 |
| 3,471,107 | 10/1969 | Ornberg | 244/199 |
| 3,831,885 | 8/1974 | Kasper | 244/214 |
| 4,132,375 | 1/1979 | Lamar | 244/90 R |
| 4,161,300 | 7/1979 | Schwaerzler et al. | 244/90 R |
| 4,182,503 | 1/1980 | Muscatell | 244/219 |
| 4,267,990 | 5/1981 | Staudacher | 244/199 |
| 4,293,110 | 10/1981 | Middleton et al. | 244/214 |

FOREIGN PATENT DOCUMENTS 517422 1/1940 United Kingdom ................. 244/214

Primary Examiner—Galen L. Barefoot
Attorney, Agent, or Firm—Howard J. Osborn; John R. Manning

[57] ABSTRACT

Traditional roll control systems such as ailerons, elevons or spoilers are least effective at high angles of attack due to boundary layer separation over the wing. This invention uses independently deployed leading edge flaps 16 and 18 on the upper surfaces of vortex stabilized wings 12 and 14, respectively, to shift the center of lift outboard. A rolling moment is created that is used to control roll in flight at high angles of attack. The effectiveness of the rolling moment increases linearly with angle of attack. No adverse yaw effects are induced. In an alternate mode of operation, both leading edge flaps 16 and 18 are deployed together at cruise speeds to create a very effective airbrake without appreciable modification in pitching moment. Little trim change is required.

5 Claims, 8 Drawing Figures

LEADING EDGE FLAP SYSTEM FOR AIRCRAFT CONTROL AUGMENTATION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; USC 2457).

This application is a continuation of application Ser. No. 301,078, filed 9/10/81 now abandoned.

BACKGROUND OF THE INVENTION

This invention generally relates to aircraft roll control systems. Particular application is to aircraft with vortex stabilizing capabilities such as highly swept wings or spanwise blowing device. Roll control is achieved with a leading edge flap system and vortex flow manipulation.

Leading edge flaps are known to the prior art. One such device is the Krueger flap (see e.g., Dommasch D. O., *Airplane Aerodynamics*, Pitman Publishing Corporation, 4th ed., p. 186). The Kreuger flap pivots about the leading edge of the airfoil to augment lift. By rotating the leading edge flap downward below the chord line, the camber of the wing is increased. This increase in camber increments lift. The Krueger flap, however, is not used for roll control. It functions solely by camber modification rather than vortex generation.

The patent to Kasper (U.S. Pat. No. 3,831,885) discloses another type of leading edge flap. Kasper's flap produces lift on low performance aircraft through vortex generation. It is designed and structured for low performance aircraft. As a result, the flaps are necessarily highly cambered and thicker than the present invention. Also, the length and width of the Kasper flap represents a greater percentage of the associated wing's span because of its low performance wing application. Kasper's flaps are not used for roll control. Spanwise lift distribution over the wing is not manipulated to create a rolling moment. The Kasper flap is used solely to augment lift on low performance tailless aircraft.

The problem of roll control exists with all aircraft. Solutions have been varied and numerous. Generally, ailerons or spoilers provide the rolling moments needed for aircraft maneuverability about their longitudinal axes. These control surfaces, however, are essentially dependent for efficient operation on attached flow over the wing's upper surface. As a result, ailerons and spoilers are largely ineffective when flow separation occurs ahead of them near the leading edges of the wings. The loss of roll controllability with these prior art devices in high lift conditions, when lateral stability and roll damping are also reduced, deteriorates tracking ability, handling characteristics, and resistance to departure from controlled flight. The present invention avoids these adverse effects with the use of independently operated leading edge flaps.

It is therefore an object of the invention to disclose a roll control system that uses a leading edge flap device to create a vortex that shifts the center of lift on one wing panel outboard to produce a controllable rolling moment away from the deployed flap.

A further object of the invention is to provide a roll control device allowing roll moment control at high angles of attack where prior art roll control systems are least effective due to boundary layer flow separation close to the leading edge of the wing.

Another object of the invention is to provide a roll control device, unlike traditional aileron controls, that produces favorable yawing moments in flight that are not adverse to coordinated flight control.

A still further object is to provide a device that when used in combination with conventional elevons produces a synergistic control effect making simultaneous use of the leading edge flap and elevons more effective to control roll than a simple addition of their individual effects would indicate.

A final object of the invention is to provide an alternate mode that is a powerful airbraking system by deploying both leading edge flaps simultaneously to cause rapid and controlled deceleration from high speed flight with neither an increase in pitching moment nor a required trim change.

SUMMARY OF THE INVENTION

The foregoing and other objects of the invention are achieved by using leading edge flaps on subsonic, transonic, supersonic and hypersonic aircraft to manipulate the vortex flow over a wing so as to generate an aircraft rolling moment. Wind tunnel tests have shown that an upper flap affixed to the leading edge of a wing generates an inboard vortex that is energized by the shear layer leaving the unattached edge of the flap. At high angles of attack, the redistribution of lift caused by the flap vortices shifts the center of lift on the wing outboard. Accordingly, whenever a leading edge flap is raised on one side of an aircraft, the resulting asymmetry in lift generates an aircraft rolling moment.

Wind tunnel tests show that the magnitude of the rolling moment increases with greater angle of attack. As a result, roll control can be maintained with leading edge flaps when ailerons and spoilers are less effective due to upstream flow separation. Furthermore, results indicate that yawing moments remain favorable throughout flap deployment and retraction. The adverse yaw problems associated with aileron roll control systems are avoided. The drag penalty due to the leading edge flap operation is negligible because vortex-created thrust on the flap surface counteracts the drag due to flap deployment. Tests also show that a synergistic effect on roll power is realized at lift coefficients above 0.6 whenever conventional elevons are used in combination with leading edge flaps. The vortex generated by the flap augments the effectiveness of the elevons so as to create more roll power than would be anticipated based on a simple summing of the individual roll control contributions from elevons and flaps.

In an alternate mode of operation, both leading edge flaps can be deployed simultaneously at cruise speeds to generate a large drag force. The drag provides a rapid and controlled deceleration from high speed flights. No adverse pitching moment is induced. As a result, the trim change associated with conventional high drag devices, such as speed brakes, is not required. The steady flow field associated with the vortex system of the leading edge flap assures low levels of buffet and wake excitation of the empennage structure unlike traditional airbrake devices that generate turbulent wakes.

A more complete appreciation of the invention can be gained by referring to the following detailed description and associated drawings.

DETAILED DESCRIPTION OF THE INVENTION

The invention is a roll control system using independently operated leading edge flaps to redistribute the lift nonsymmetrically over a wing so as to create a rolling moment. The moment is used to aerodynamically augment roll control at high angles of attack. Independently raising one of two leading edge flaps manipulates the vortex flow over that wing. The center of lift is shifted outboard creating the rolling moment. Though the preferred embodiment describes devices attached to supersonic aircraft wings, other applications for this invention will become apparent to those skilled in the art.

Figure 1:
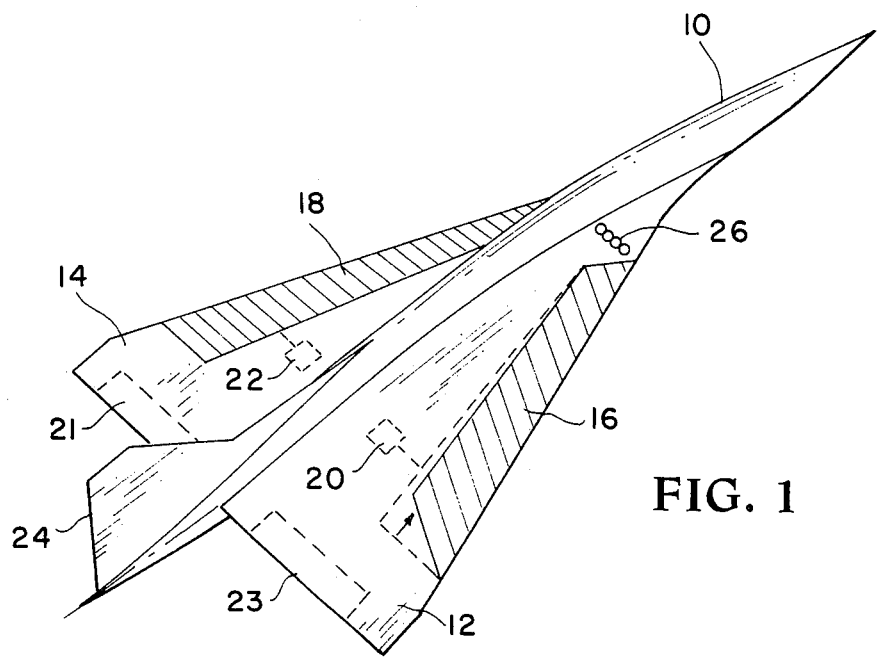
FIG. 1 is a perspective view of a representative aircraft showing both a retracted and deployed leading edge flap.

FIG. 1 is a perspective view of a representative aircraft 10 and illustrates a preferred embodiment of the invention. The aircraft 10 has wings 12 and 14, leading edge flaps 16 and 18, elevons 21 and 23, and empennage structure 24. The flaps 16 and 18 measure 10–15 percent of the wing span at their trailing edge, and are attached to the leading edge. Flaps 16 and 18 are normally retracted flush with the wing upper surface to conform to the airfoil shape.

Typical hydraulic actuators 20 and 22 and associated hydraulic system lines are used to deploy flaps 16 and 18, respectively. The basic aircraft 10 must have a means for stabilizing the vortex flow generated by a deployed leading edge flap. Although a highly swept wing will serve to stabilize the vortices, a spanwise jet blowing system can be used alternatively or in combination with wing sweep to energize the vortex flow. Blowing systems are typically comprised of ducts leading from the aircraft engine compressor section to openings on the upper surface of each wing. As depicted by reference numeral 26 in FIG. 1, the openings are normally positioned near the junction between the wing root and fuselage. Compressor air is forced out the openings 26 toward the tip of each wing. The forced air induces an increased axial velocity in the vortex core and thereby stabilizes the vortex flow over the associated wing 12. With such stabilization, the flap on either wing panel can be raised to a suitable angle as shown by flap 16 to create a rolling moment toward the opposite wing 14.

OPERATION OF THE INVENTION

Figure 2:
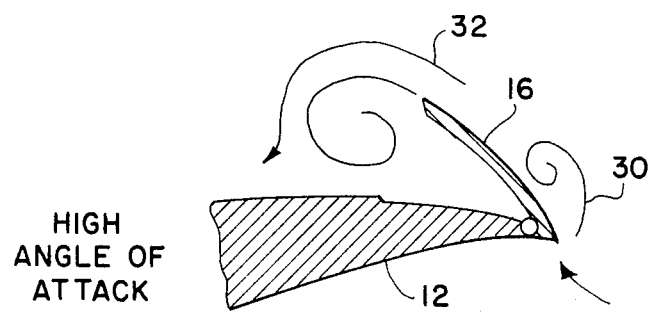
FIG. 2 is a schematic sectional view showing the vortex flow pattern at high angles of attack in a plane normal to the wing's leading edge.

The flow patterns resulting from deployment of flap 16 are of two types depending on angle of attack. FIG. 2 shows the more relevant high angle of attack case. A system of two vortices is obtained, vortex 30 on the upper surface of flap 16 and vortex 32 inboard on the wing 12. The redistribution of spanwise lift caused by flap 16 is shown schematically in FIG. 4. Vortex 32 shifts the center of lift toward the wing 12 and produces the desired rolling moment.

Figure 3:
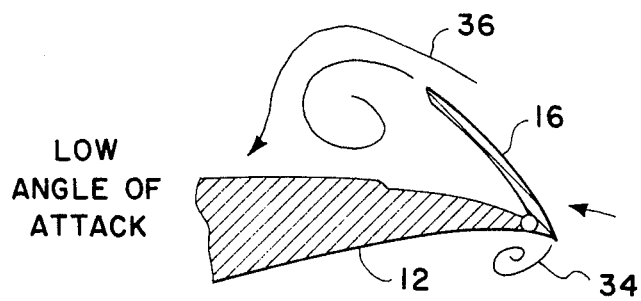
FIG. 3 shows the vortex pattern from the same perspective view at low angles of attack.

At low angles of attack, the flow pattern in FIG. 3 predominates. The first vortex 34 occurs below the leading edge. This low angle of attack case is not relevant to the roll control function of this invention; however, it will be discussed below in relation to an alternate mode operation using leading edge flaps as airbrakes at cruise speeds.

The primary mode of operation uses hydraulic actuators 20 or 22 in FIG. 1 to deloy flap 16 or 18, respectively. Raising flap 16, for example, at high angle of attack, creates the vortex flow in FIG. 2. Spanwise jet blowing system 26, described earlier, is used in combination with the highly swept wing 12 to stabilize the generated vortex flow.

Figure 4:
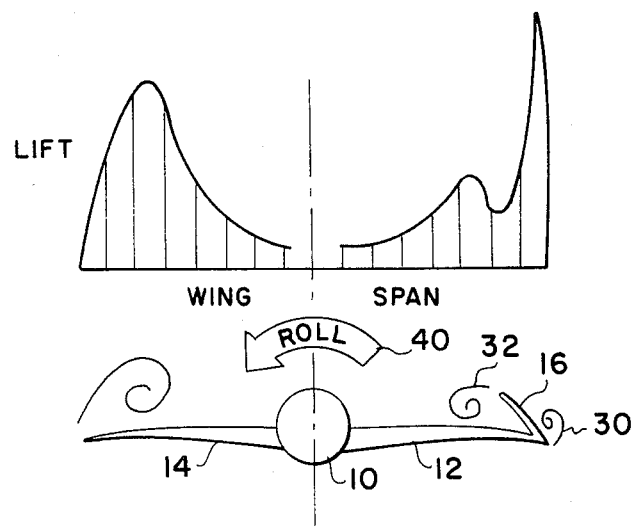
FIG. 4 is a schematic and a graph showing the spanwise redistribution of lift and rolling motion due to flap deployment at high angles of attack.

Following flap deployment, the vortices redistribute the lift over wing 12 as shown in FIG. 4. The shift in center of lift creates the desired rolling moment depicted by arrow 40 in FIG. 4 toward the opposite wing 14. The roll control is used to maneuver the aircraft at high angle of attack when traditional elevons 21 and 23 are least effective due to boundary layer separation. Use of flap 18 alone will create a rolling moment toward wing 12 in a similar manner.

Figure 5:
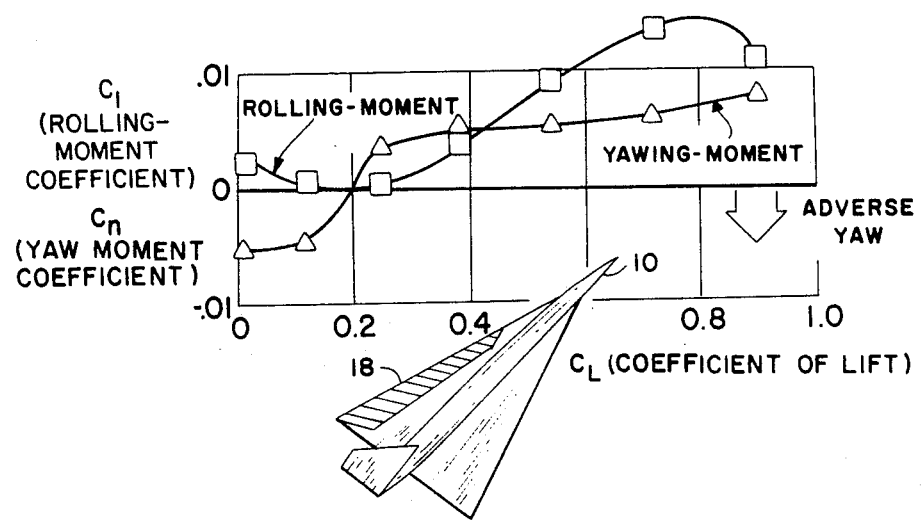
FIG. 5 is a graph showing the aerodynamic characteristics of a typical 74° delta wing with a leading edge flap deployed for roll control, further rolling moment and yawing moment plotted versus coefficient of lift.

Subsonic wind tunnel data from the NASA/Langley 7×10 Foot High Speed Tunnel for a leading edge flap simulated on wing 14 of a 74° delta wing research model is shown in FIG. 5. FIG. 5 depicts the rolling moment available from leading edge flap deployment at higher angle of attack. As mentioned, the magnitude of the rolling moment increases linearly with angle of attack. FIG. 5 also shows that the favorable yawing moments are experienced throughout the high angle of attack flight regime. The absence of adverse yaw is a significant advantage over prior art aileron-type roll control systems. As the induced yawing moment acts in the direction of turn, little rudder assistance is required to offset adverse yaw.

Figure 6:
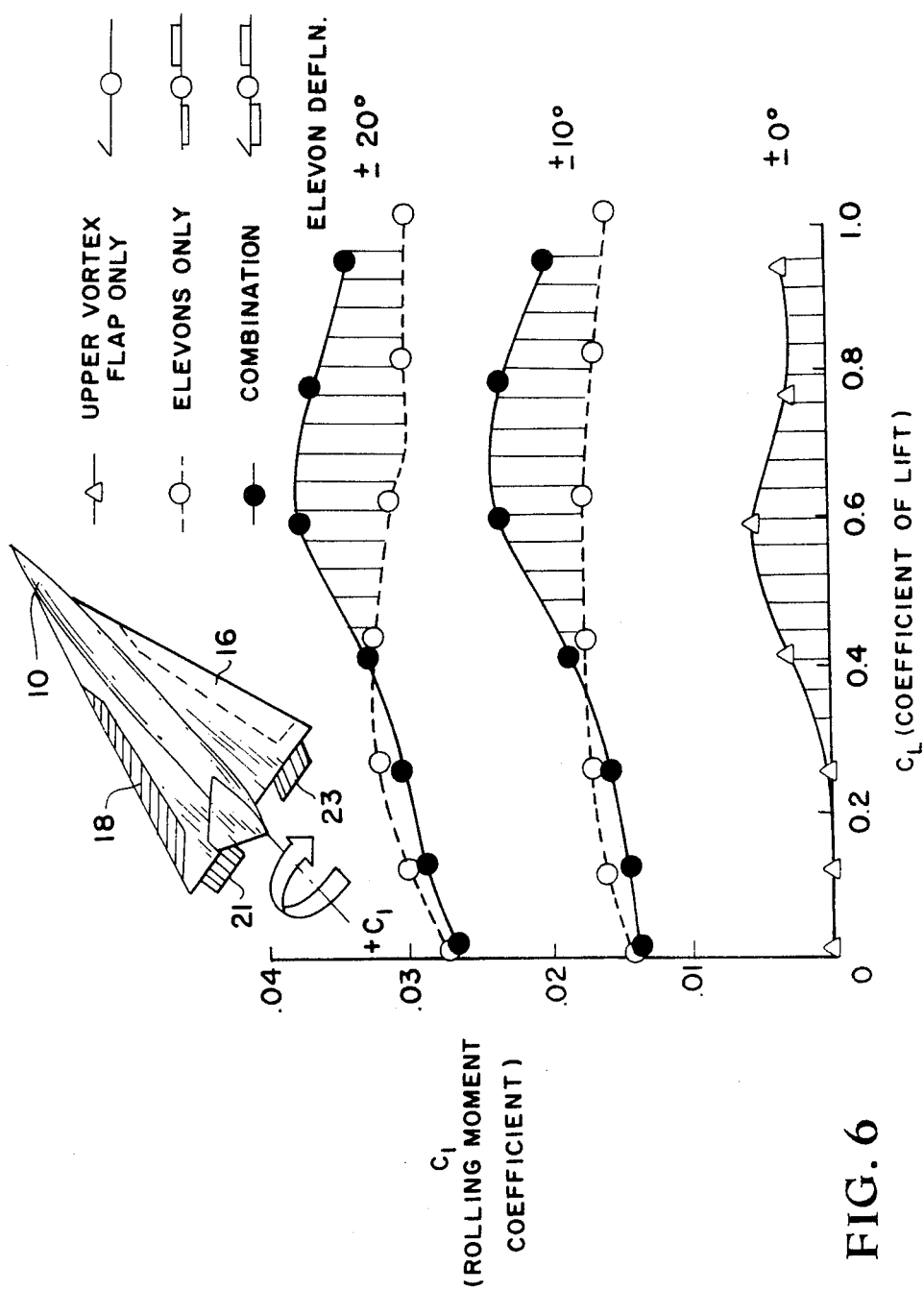
FIG. 6 is a graph of rolling moment versus coefficient of lift for three values of elevon deflection showing how leading edge flap deployment synergistically augments elevon roll power. The schematic in the upper left portion of FIG. 6 shows the physical arrangement of the control surfaces for the three elevon deflection values.

With delta wing aircraft, conventional elevons 21 and 23 will still be needed for roll control during the cruise phase of flight. A combination of elevons and leading edge flaps are very effective, however, at higher angles of attack. Wind tunnel data presented in FIG. 6 shows that the two contributions to rolling moment are essentially additive. However, a synergistic effect making the combination of elevons and leading edge flaps more effective than a simple sum of the individual control contributions would indicate is realized in the $C_L$ (coefficient of lift) range from 0.6 to 1.0. Use of leading edge flaps augments elevon effectiveness because of the suction induced by the inboard vortex from flap 18 passing over the down deflected elevon 21. This suction creates the synergistic control response when leading edge flaps and elevons are deflected together at high angles of attack.

Figure 7:
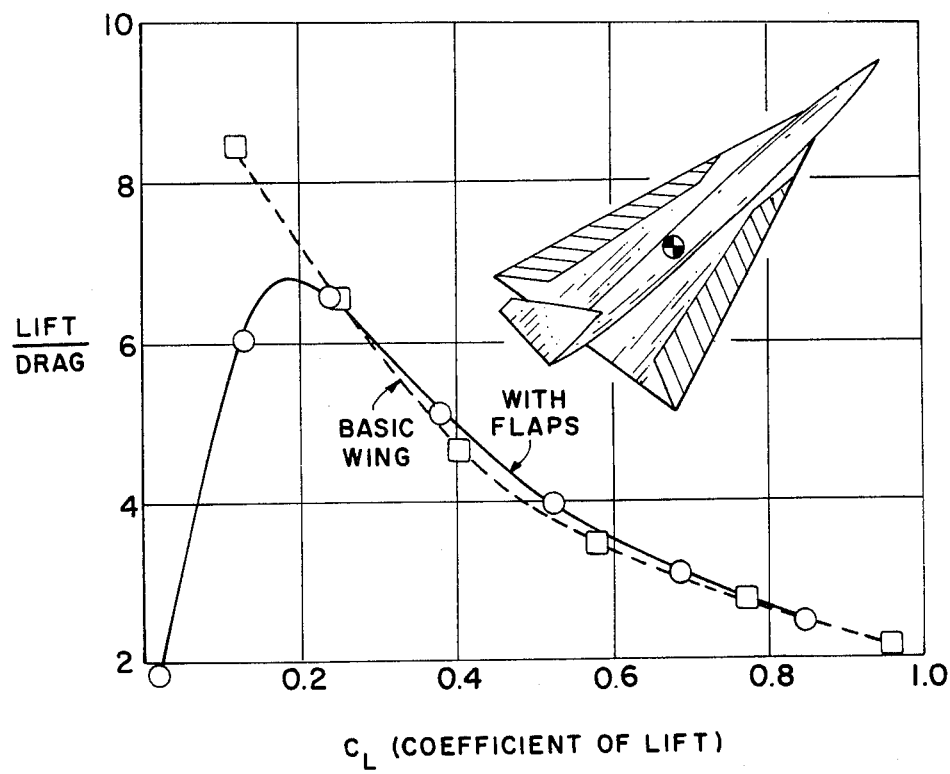
FIG. 7 is a plot of the lift-to-drag ratio versus coefficient of lift for a 74° delta wing with symmetric deployment of both leading edge flaps.
Figure 8:
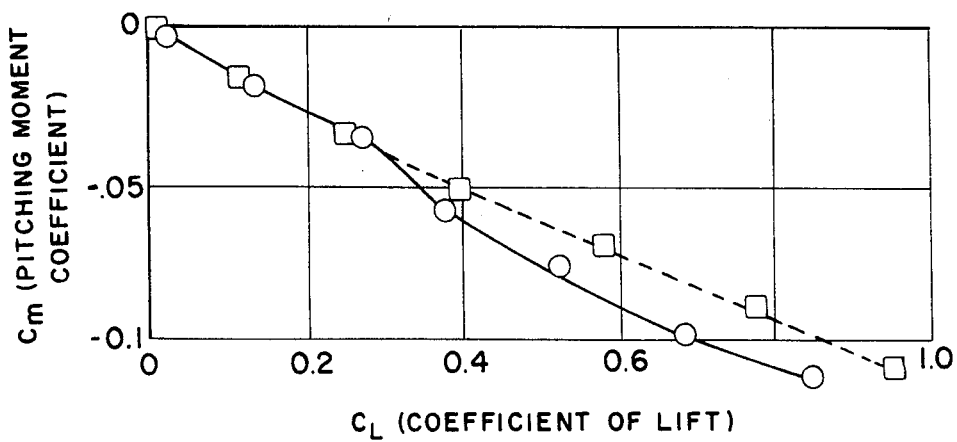
FIG. 8 is a plot of pitching moment coefficient versus lift coefficient for symmetric leading edge flap deployment.

In an alternate mode of operation the leading edge flaps 16 and 18 on both wings 12 and 14 may be deployed together. The effect on lift-to-drag ratio is indicated in FIG. 7. A large drag force associated with the flow pattern in FIG. 3 is incurred in the preferred embodiment at lift coefficients below 0.2. Such drag force can be encountered in the $C_L$ range from 0.0 to 0.4 depending on the configuration of the particular aircraft used. In such cases, the resulting drag can be used quite effectively to decelerate from high speed flight. In addition, pitching moment characteristics shown in FIG. 8 indicate that little or no trim change is required with symmetric flap deployment at high speeds. The steady nature of the vortex flow field yields exceptionally low buffet levels during deceleration, and avoids wake excitation of the empennage structure 24 in FIG. 1.

Although the invention has been described relative to a particular embodiment thereof, there are obviously numerous variations and modifications readily apparent to those skilled in the art in light of the above teachings. It is, therefore, to be understood that the invention may be practiced otherwise than as specifically described.

What is claimed as new and desired to be secured by Letters Patent of the United States is:

1. A roll control system for an aircraft capable of subsonic, transonic, supersonic or hypersonic flight comprising:

a fuselage;

a highly swept-back, slender wing section attached to each side of said fuselage;

means for stabilizing vortex flows over said wing sections;

said wing sections each including an associated flap means, the leading and trailing edges of which are sharp, and the leading edges of which are attached along the leading edges of the wing sections;

means for independently moving each said flap means from a first position flush with the wing upper surface to a deployed position wherein the trailing edge of the flap means extends at an upward angle of deflection relative to said wing section into the airstream;

the lifting of one of said flap means into the airstream being used to manipulate the vortex flow generated at high angles of attack into a suction vortex on the upward facing surface of the flap means and into an inboard vortex, whereby the center of lift on one of the wing sections containing the deployed flap means moves outboard to produce a rolling moment.

2. The roll control system of claim 1 wherein said flap means are attached near the leading edge of said wing sections.

3. A roll control system as in claim 1 wherein the span of each flap means at the trailing edge measures 10–15 percent of the associated wing section's span.

4. The roll control system of claim 1 wherein said means of stabilizing the vortex flow over the wing sections is a spanwise jet blowing device.

5. The roll control system of claim 1 wherein the swept wing planform has sweep-back angle in the range of 60° to 74°.

* * * * *